(12) United States Patent
Shintani et al.

(10) Patent No.: US 7,446,981 B2
(45) Date of Patent: Nov. 4, 2008

(54) MAGNETIC HEAD, FABRICATION PROCESS OF MAGNETIC HEAD, AND MAGNETIC DISK STORAGE APPARATUS MOUNTING MAGNETIC HEAD

(75) Inventors: Taku Shintani, Kanagawa (JP); Katsuro Watanabe, Ibaragi (JP); Nobuo Yoshida, Kanagawa (JP); Hisako Takei, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/492,324

(22) Filed: Jul. 24, 2006

(65) Prior Publication Data
US 2007/0030592 A1 Feb. 8, 2007

(30) Foreign Application Priority Data
Aug. 5, 2005 (JP) .............................. 2005-228055

(51) Int. Cl.
*G11B 5/33* (2006.01)
(52) U.S. Cl. ...................................... 360/324
(58) Field of Classification Search ................. 360/317, 360/319, 322, 324
See application file for complete search history.

(56) References Cited

U.S. PATENT DOCUMENTS

| | | | |
|---|---|---|---|
| 6,134,089 A * | 10/2000 | Barr et al. ..................... 360/322 |
| 6,396,670 B1 * | 5/2002 | Murdock ....................... 360/319 |
| 6,858,909 B2 | 2/2005 | Cyrille et al. | |
| 6,882,507 B2 * | 4/2005 | Shiraki et al. ................. 360/317 |
| 2001/0030840 A1 * | 10/2001 | Shiraki et al. ................. 360/317 |
| 2004/0042126 A1 * | 3/2004 | Watanabe et al. ............. 360/319 |
| 2004/0150922 A1 | 8/2004 | Kagami et al. | |
| 2004/0257711 A1 * | 12/2004 | Ushiyama et al. ............ 360/317 |
| 2005/0162784 A1 * | 7/2005 | Shiraki et al. ................. 360/317 |

FOREIGN PATENT DOCUMENTS

| JP | 2002-150518 A | | 5/2002 |
|---|---|---|---|
| JP | 2002150518 A | * | 5/2002 |
| JP | 2003-060266 | | 2/2003 |
| JP | 2003-085711 | | 3/2003 |

* cited by examiner

*Primary Examiner*—Tianjie Chen
(74) *Attorney, Agent, or Firm*—Townsend and Townsend and Crew LLP; Rambod Nader

(57) ABSTRACT

This invention provides a high-output magnetic head with a high yield, which is capable of minimizing sense current leak or noise caused by a shift of the magnetic wall of an upper shield layer. In one embodiment, the magnetic head is fabricated so that the height of the upper surface of the refill film along the sensor height direction is the same as that of the magnetoresistance layer in a portion where the refill film along the sensor height direction comes in contact with the magnetoresistance layer and the distance from the upper surface of the refill film along the sensor height direction to the upper surface of the lower shield layer gradually increases in a region from the portion where the refill film along the sensor height direction comes in contact with the magnetoresistance layer to a point at a certain distance away from the portion.

8 Claims, 19 Drawing Sheets

MAGNETIC HEAD, FABRICATION PROCESS OF MAGNETIC HEAD, AND MAGNETIC DISK STORAGE APPARATUS MOUNTING MAGNETIC HEAD

CROSS-REFERENCES TO RELATED APPLICATIONS

This application claims priority from Japanese Patent Application No. JP2005-228055, filed Aug. 5, 2005, the entire disclosure of which is incorporated herein by reference.

BACKGROUND OF THE INVENTION

The present invention relates to a magnetic head that reads magnetically recorded data, the process of fabricating the magnetic head, and magnetic disc storage apparatus mounting the magnetic head and in particular to a magnetic head having a high S/N ratio and a high yield and a magnetic disc storage apparatus mounting the magnetic head.

A magneto-resistive sensor using a magnetoresistance effect, which causes electrical resistance to vary with a change in an external magnetic field, is known to be an excellent magnetic field sensor and therefore, it has been put into practical use as a read sensor for detecting a signal magnetic field from a magnetic recording medium storage in the magnetic head, an important part of the magnetic disc storage apparatus.

Recording density of the magnetic disc storage apparatus has remarkably improved and is now continuously improving and the need for the read sensor with two improved characteristics has arisen, namely a smaller track width and a higher recording/read performance. At present, the read characteristic is being supersensitized by evolving an MR head using the magnetoresistance effect. At several Gb/in$^2$ of recording density, an anisotropic magnetoresistance (AMR) effect is used to convert magnetic signals on the magnetic recording medium into electric signals and at a higher recording density, a supersensitive giant magnetoresistance (GMR) effect is employed.

To meet the need for the higher recording density, research and development of a method, in which a detect current flows in an almost perpendicular to the plane of the film, have been conducted. This method which is called the CPP (Current Perpendicular to the Plane) method has an advantage in narrowing a distance between the upper and lower shield layers (read gap length). The read sensors using a CPP-GMR or tunneling magnetoresistance (TMR) effect have already been reported.

FIGS. 1 and 2 show a basic structure of a CPP read sensor. FIG. 1 shows the cross section along track width direction of a CPP type read sensor. X, Y and Z axes shown in FIG. 1 indicate the track width direction, sensor height direction, and thickness direction of the magnetoresistance layer, respectively. It should be noted that the X, Y, and Z axes in all the drawings in this specification indicate the same X, Y, and Z axes shown in FIG. 1. The refill film 1 along the track width direction is disposed in contact with the surface of the side wall of a magnetoresistance layer 3. A longitudinal bias layer or a side shield layer 5 is not always necessary. In FIGS. 1, 2 and 4 indicate the upper shield layer and the lower shield layer, respectively.

FIG. 2 is a cross sectional diagram along the CPP sensor height direction taken along an aa' line shown in FIG. 1. In FIG. 2, on a right side, an air bearing surface 13 of the read sensor is shown. Like the refill film along the track width direction, the refill film along the sensor height direction 6 is disposed in contact with the wall surface of the magnetoresistance layer. The refill film 1 along the track width direction and the refill film along the sensor height direction 6 are made of the insulator such as alumina.

As shown in FIG. 2, the present invention relates to the magnetic head having at least an under layer 51, a pinned layer 52, an intermediate layer 53, a free layer 54, and a cap layer 55, all of which are composing elements of the magnetoresistance layer 3. In the accompanying drawings of the specification, the pinned layer 52 is disposed at a position closer to the lower shield layer 4 than to the free layer 54; nevertheless, the positions, at which the pinned layer 52 and the free layer 54 are disposed, may be switched. The under layer 51 and the cap layer 55 may include such layers that provide functions of controlling a magnetic domain and of stabilizing the magnetization orientation of the pinned layer 52 or the like, respectively. In FIG. 1 and FIGS. 3 and 4 described later, in particular, the detailed structure of the magnetoresistance layer 3 is omitted; however, it should be noted that the magnetoresistance layer 3 has the same structure as that shown in FIG. 2.

In the CPP read sensor, the upper shield layer 2 and the lower shield layer 4 come usually in electrically contact with the magnetoresistance layer 3 to minimize its read gap length. In other words, the upper shield layer 2 and the lower shield layer 4 have the function as the electrode for flowing a current into the magnetoresistance layer 3.

FIG. 3 is a flow diagram showing a process of forming the sensor height. In a process of patterning the magnetoresistance layer to form the sensor height, the magnetoresistance layer 3 is protected with the lift-off mask 11 as shown in FIG. 3(a), and then unnecessary regions are etched away as shown in FIG. 3(b). In this etching process, an ion beam etching method using Ar ions or a Reactive Ion Etch (RIE) method using a chlorine gas or carbon dioxide gas is used generally. After etching, the refill film along the sensor height direction 6 is formed as shown in FIG. 3(c). And then, the lift-off mask 11 and unnecessary portions of the refill film are removed as shown in FIG. 3(d) to form the sensor height of the magnetoresistance layer 3. Subsequently, as shown in FIG. 3(e), the upper shield layer 2, which also acts as an upper electrode, is deposited on the magnetoresistance layer 3 and the refill film along the sensor height direction 6.

To meet the need for increasing the recording density, the track width has been narrowed to 100 nm now. It is required that the sensor height has the same size as the track width to minimize an effect of shape magnetic anisotropy on the free layer.

A patent document JP-A No.085711/2003 discloses a structure, in which the refill film has been disposed on the upper part of a magnetoresistance layer to cause a sense current to flow only in the vicinity of an air bearing surface of a magnetoresistance layer. This technique allows the sense current to concentrate only in the vicinity of the air bearing surface of the magnetoresistance layer; however, it has a disadvantage in that any ingenuity, such as the use of multi layer resist, is necessary and it is difficult to control the length of the refill film on the upper part of a magnetoresistance layer.

To fabricate a smaller sensor height, a process of forming the sensor height without fence or lift-off error is necessary. It is because if fence or lift-off error occurs, the magnetoresistance layer may have loose contact with the upper shield layer. The patent document JP-A No. 186673/2004 discloses a method for using the Chemical Mechanical Polishing (CMP) method in the lift-off process to remove the resist patterns and fence, avoiding lift-off error (incomplete removal of the lift-off mask material) and fence.

A process of lift-off using CMP may damage the upper surfaces of the magnetoresistance layer and of the refill film when the resist patterns and fence are removed. The patent document JP-A No. 186673/2004 discloses a method, by which a first stopper layer and a second stopper layer are deposited on the magnetoresistance layer and the refill film respectively, to avoid any damage to the upper surfaces of the magnetoresistance layer and of the refill film. These stopper layers are made of Diamond-Like Carbon (DLC).

FIG. 4 is a schematic diagram of a process of lift-off using CMP. As shown in FIG. 4(a), first, the first stopper layer 41 and then the lift-off mask 11 are deposited on the magnetoresistance layer 3. As shown in FIG. 4(b), second, the first stopper layer 41 is etched and then, as shown in FIG. 4(c), the magnetoresistance layer 3 is patterned by etching. As shown in FIG. 4(d), third, the refill film along the sensor height direction 6 and the second stopper layer 42 are deposited and then as shown in FIG. 4(e), unnecessary portions of the lift-off mask 11 and the refill film along the sensor height direction 6 are lifted off by CMP. As shown in FIG. 4(f), finally, the first stopper layer 41 and the second stopper layer 42 are removed. The process of lift-off using CMP may solve problems of fence occurrence and lift-off error, which may arise in a conventional lift-off method.

Primary importance is attached to the prevention of the sense current from leaking, and various leakage prevention ideas are tried to meet the need for increasing recording density. The patent document JP-A No.241763/2004 discloses a method, by which after etching, the wall surface of the magnetoresistance layer is oxidized to prevent the sense current from leaking and sensor characteristics from deteriorating in an annealing process. The patent document JP-A No.060266/2003 discloses a method for preventing the magnetoresistance layer from being damaged during air bearing surface processing and the sense current from leaking by wet-etching polishing.

BRIEF SUMMARY OF THE INVENTION

As shown in FIG. 2, it is preferable that the upper surface of the refill film along sensor height direction 6 has the same height as that of the magnetoresistance layer 3, namely, the thickness of the refill film along the sensor height direction 6 is the same as that of the magnetoresistance layer 3. In fact, however, a portion of the refill film along the sensor height direction 6 is hidden by the lift-off mask 11 in the vicinity of the magnetoresistance layer 3 in the process of forming the refill film along the sensor height direction 6, and thereby the thickness of a portion, which is in contact with magnetoresistance layer 3, of the refill film along the sensor height direction 6 gets thinned. Accordingly, in the process of depositing the refill film along the sensor height direction 6 and the second stopper layer 42 as shown in FIG. 4(d), it is often seen that the upper surface of the refill film along the sensor height direction 6 in the vicinity of the portion in contact with the magnetoresistance layer 3 is lower than the upper surface of the intermediate layer 53 of the magnetoresistance layer 3 as shown in FIG. 5. If the read sensor is fabricated into such a shape, two problems described below may arise.

One is the degradation of output due to leakage of the sense current. In the case where lift-off using CMP is applied in the state as shown in FIG. 5, slurry tends to pool on the side walls of the magnetoresistance layer 3 because the second stopper layer 42 is significantly lower than the first stopper layer 41, and therefore local polishing rate rises. Additionally, polishing pad tends to hit against the first stopper layer 41, in particular at its corner (the portion indicated by a circle) in FIG. 5, and also the edge of the magnetoresistance layer 3), because no difference is found between the heights of the first and second stopper layers 41, 42 as indicated by dotted lines in FIG. 5 with the exception of other than the point of the refill film along the sensor height direction 6 being in contact with the magnetoresistance layer 3. In the results of lift-off using CMP process mentioned above, at the point where the refill film along the sensor height direction 6 and the magnetoresistance layer 3 come in contact with each other, the portion of the refill film along the sensor height direction 6, which comes in contact with the side wall of the magnetoresistance layer 3, is etched. The result is that a portion of the side wall of the magnetoresistance layer 3 is not covered as shown in FIG. 6 and the upper part of the magnetoresistance layer 3 is polished.

In the case where the side wall of the magnetoresistance layer is not covered with the refill film along the sensor height direction 6 and is exposed, in particular, the layer lower than the intermediate layer 53 is not covered with the refill film along the sensor height direction 6, the side wall of a layer closer to the lower shield layer 4 than to the intermediate layer 53 of the magnetoresistance layer 3 (pinned layer 52 and under layer 51 in FIG. 7) comes in contact with the upper shield layer 2 as shown in FIG. 7 in depositing the upper shield layer 2 in a subsequent process shown in FIG. 3(e). The upper shield layer 2 comes in contact with the side wall closer to the lower shield layer 4 than to the intermediate layer 53, and thereby the current path which does not pass three layers of the magnetoresistance layer 3, the free layer 54, the intermediate layer 53, and the pinned layer 52, may be formed, causing a problem of the deteriorated output of the read sensor.

The other problem is that a magnetic domain of the upper shield layer 2 is easily formed in the vicinity of magnetoresistance layer 3 due to a step occurring in the upper shield layer 2. This magnetic domain of the upper shield layer 2 possibly causes a noise source. In the case where CMP is applied in the state as shown in FIG. 5, even if the refill film along the sensor height direction 6 is not etched at the point where the refill film along the sensor height direction 6 comes in contact with the side wall of the magnetoresistance layer 3 as shown in FIG. 8, the upper shield layer 2 has the step in the vicinity of the magnetoresistance layer 3 of the upper shield layer 2. Accordingly, this step causes the magnetic domain to be formed in the upper shield layer 2, possibly causing a noise source. In contrast to the structure in FIG. 8, in such structures where the refill film is thicker than the magnetoresistance layer at an inclination of a steep angle in the vicinity of the magnetoresistance layer, illustrated in the patent documents JP-A No. 241763/2004 and JP-A No.060266/2003, the magnetic domain tends to be formed in the upper shield layer 2, easily causing noise.

In the case of conventional magnetic heads, these two problems lower the manufacturing yield of the read sensor. A feature of the present invention is to solve these problems.

The magnetic head according to an embodiment of the present invention has a magnetoresistance layer, lower and upper shield layers, which also act as a pair of electrodes, disposed so that the magnetoresistance layer is sandwiched between them along the magnetoresistance layer thickness direction, and a refill film disposed at an end of the magnetoresistance layer along the sensor height direction. Assuming that the thickness of the magnetoresistance layer is a and the thickness of the refill film is b, this magnetic head has a relationship of b>a.

The thickness of the refill film is approximately a at a point where it comes in contact with the magnetoresistance layer and a relationship of b≧1.2a is satisfied. Namely, the refill film has a region where the thickness monotonously increases along the sensor height direction from a to b and a region where a constant thickness b is kept.

This magnetic head may be fabricated by the fabrication process involving: a step of depositing the magnetoresistance layer on the lower shield layer, a step of depositing the first stopper layer on the magnetoresistance layer, a step of forming the lift-off mask on the first stopper layer, a step of forming the sensor height of magnetoresistance layer using the lift-off mask as a mask by etching, a step of forming the refill film along sensor height which is thicker than that of the magnetoresistance layer and contact with the side wall of magnetoresistance layer, a step of depositing the second stopper layer on the refill film along sensor height, a step of chemically mechanically polishing the lift-off mask for removal, a step of removing the first and second stopper layers, and a step of forming the upper shield layer.

According to the present invention, the structure that prevents the side wall of the magnetoresistance layer from exposing to avoid any leakage of the sense current may be built by the lift-off process using CMP and a step formed at the point where the refill film along the sensor height direction comes in contact with the magnetoresistance layer may be reduced, achieving the magnetic head of high output but low noise. Moreover, mounting the magnetic head of the present invention achieves a high-recording density of magnetic storage. Furthermore, the manufacturing yield of the magnetic head may be improved.

DETAILED DESCRIPTION OF THE INVENTION

Figure 9:
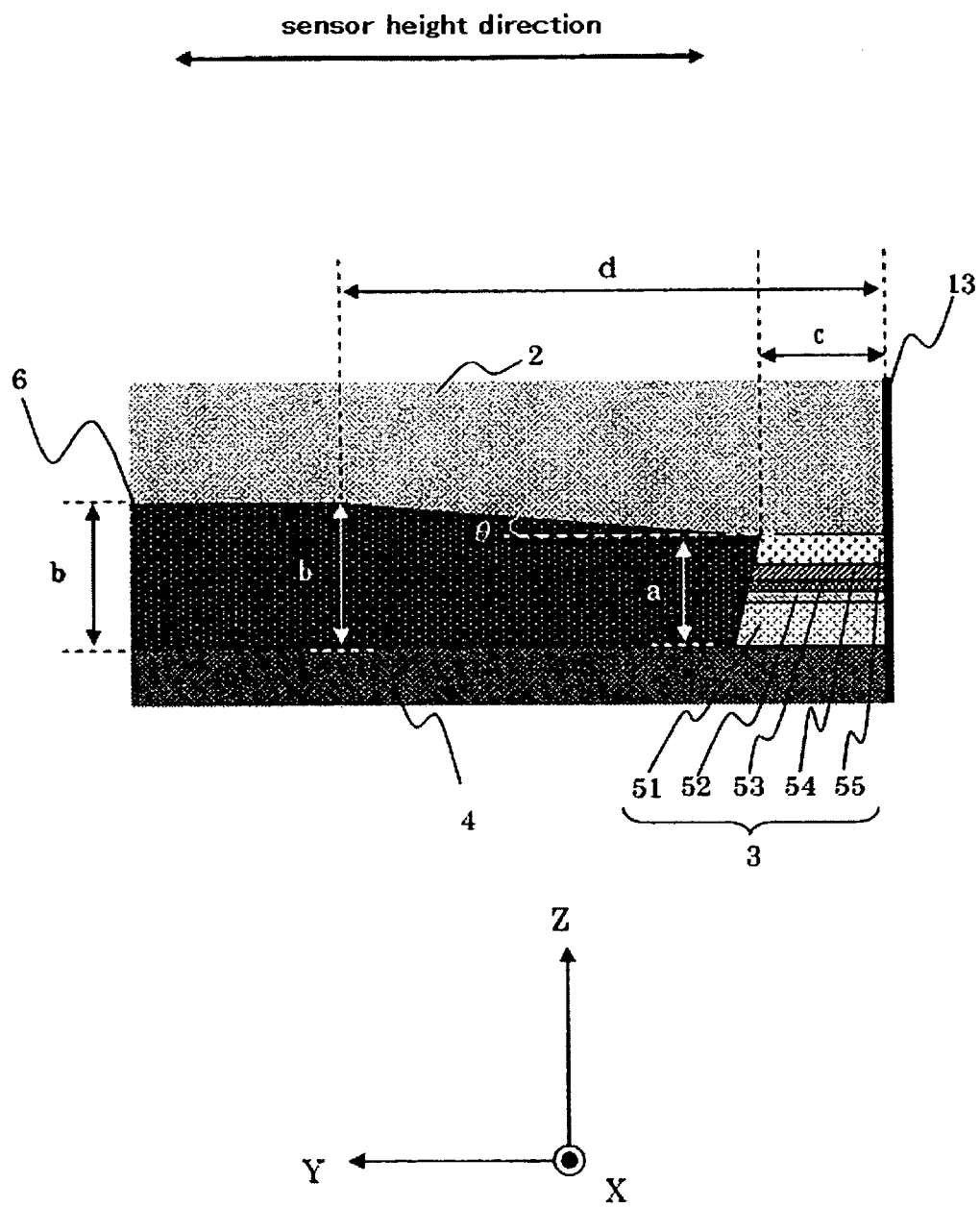
FIG. 9 is a schematic diagram of the cross section of the CPP read sensor of the present invention along the sensor height direction.

FIG. 9 shows an example of a cross sectional structure along the sensor height direction of the magnetic head of the present invention. The magnetic head of the present invention basically meets three structural requirements described below.

(1) The refill film along the sensor height direction 6 is in contact with the ends of all the layers closer to the lower shield layer 4 than to the intermediate layer 53 of the magnetoresistance layer 3.

(2) The distance from the upper surface of the refill film along the sensor height direction 6 to the upper surface of the lower shield layer 4 (in other words, the length of a perpendicular drawn from the upper surface of the refill film along the sensor height direction 6 to the upper surface of the lower shield layer 4) is shortest at the point where the refill film along the sensor height direction 6 comes in contact with the magnetoresistance layer 3 (in other words, at the closest position to the upper shield layer 2 among positions where the refill film along the sensor height direction 6 comes in contact with the magnetoresistance layer 3). In FIG. 9, it is distance a.

(3) The longest distance of the perpendicular drawn from the upper surface of the refill film along the sensor height direction 6 to the upper surface of the lower shield layer 4 (in FIG. 9, it is a distance b) is larger than the longest distance of the perpendicular drawn from the upper surface of the magnetoresistance layer 3 to the upper surface of the lower shield layer 4.

Figure 1:
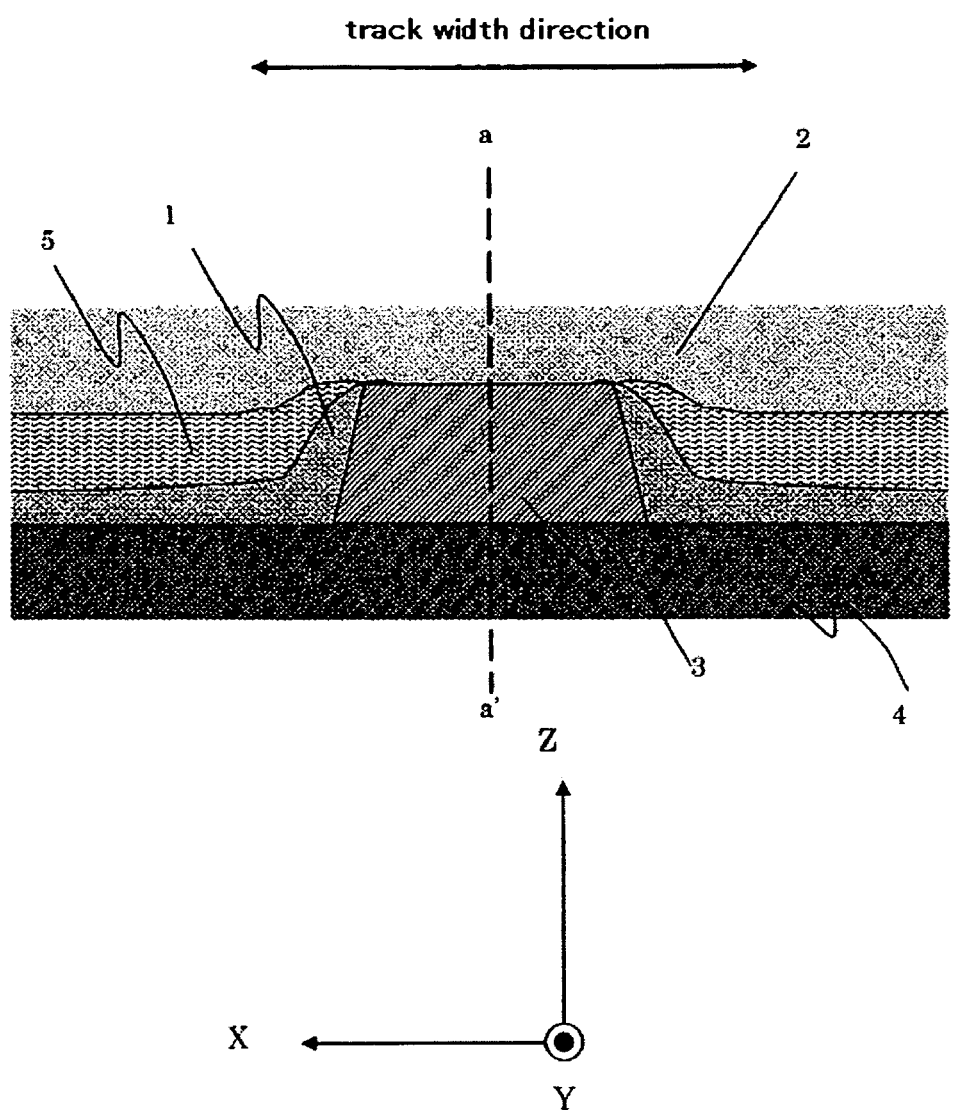
FIG. 1 is a schematic diagram of the cross section of a CPP read sensor along the track width direction.
Figure 2:
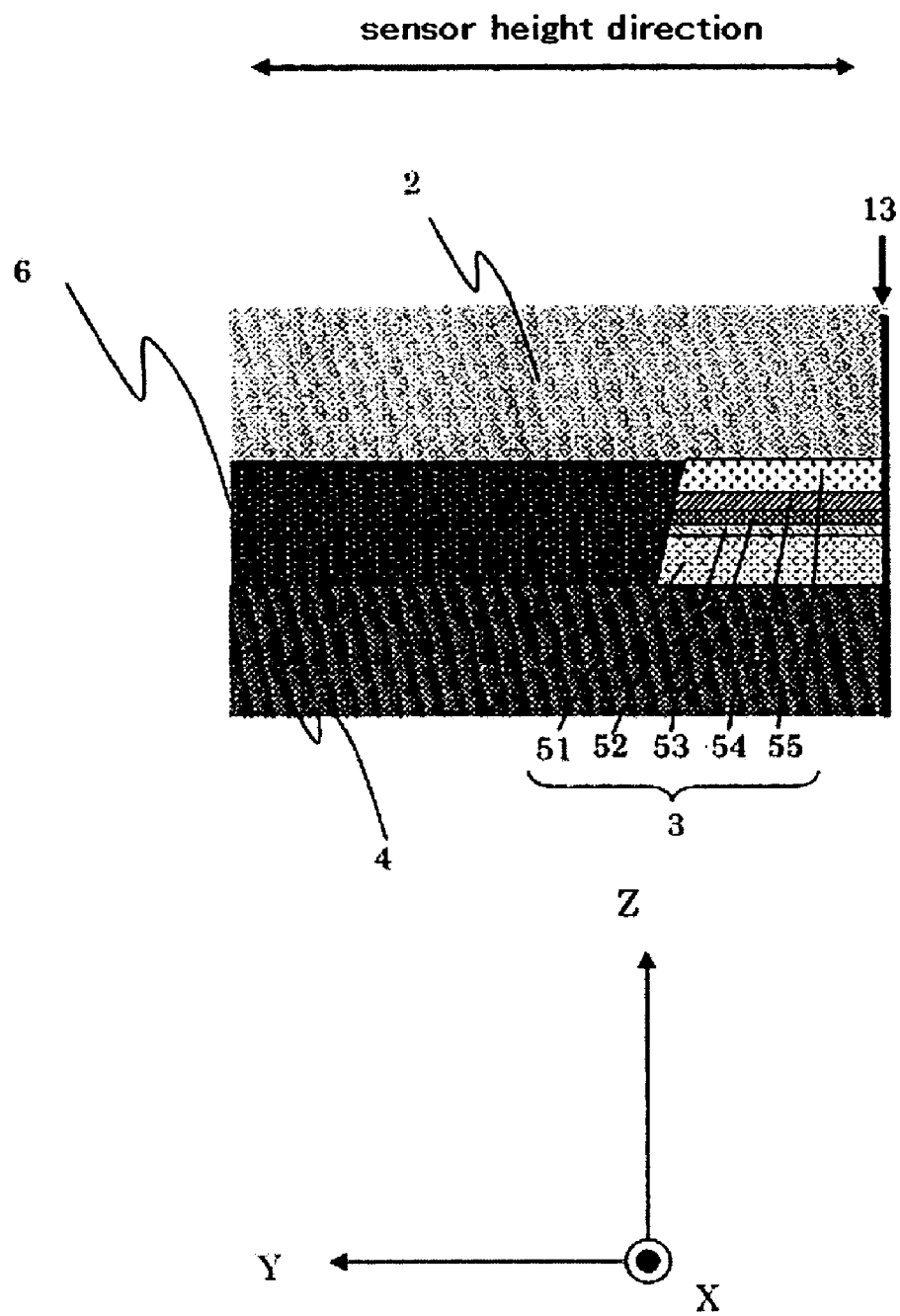
FIG. 2 is a schematic diagram of the cross section of the CPP read sensor along the sensor height direction.
Figure 3:
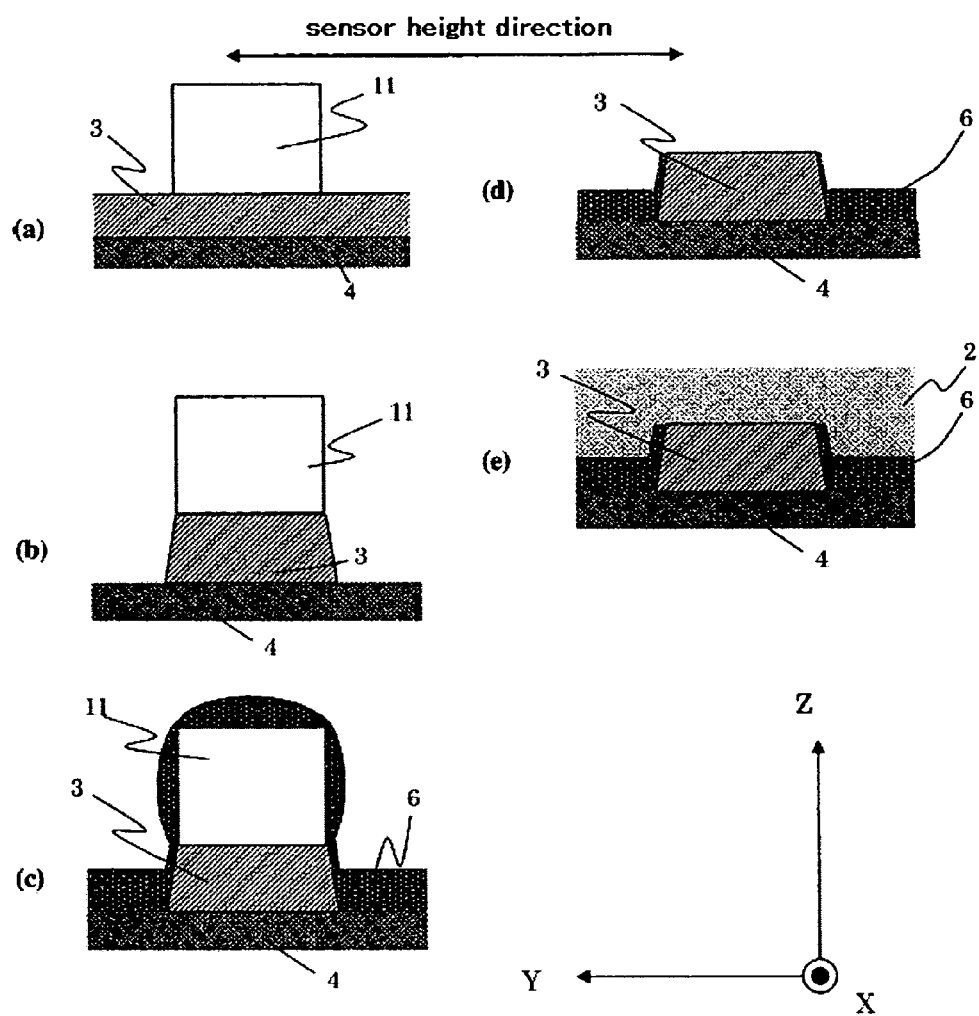
FIG. 3 is a flow diagram of a process of forming a sensor height of the CPP read sensor.
Figure 4:
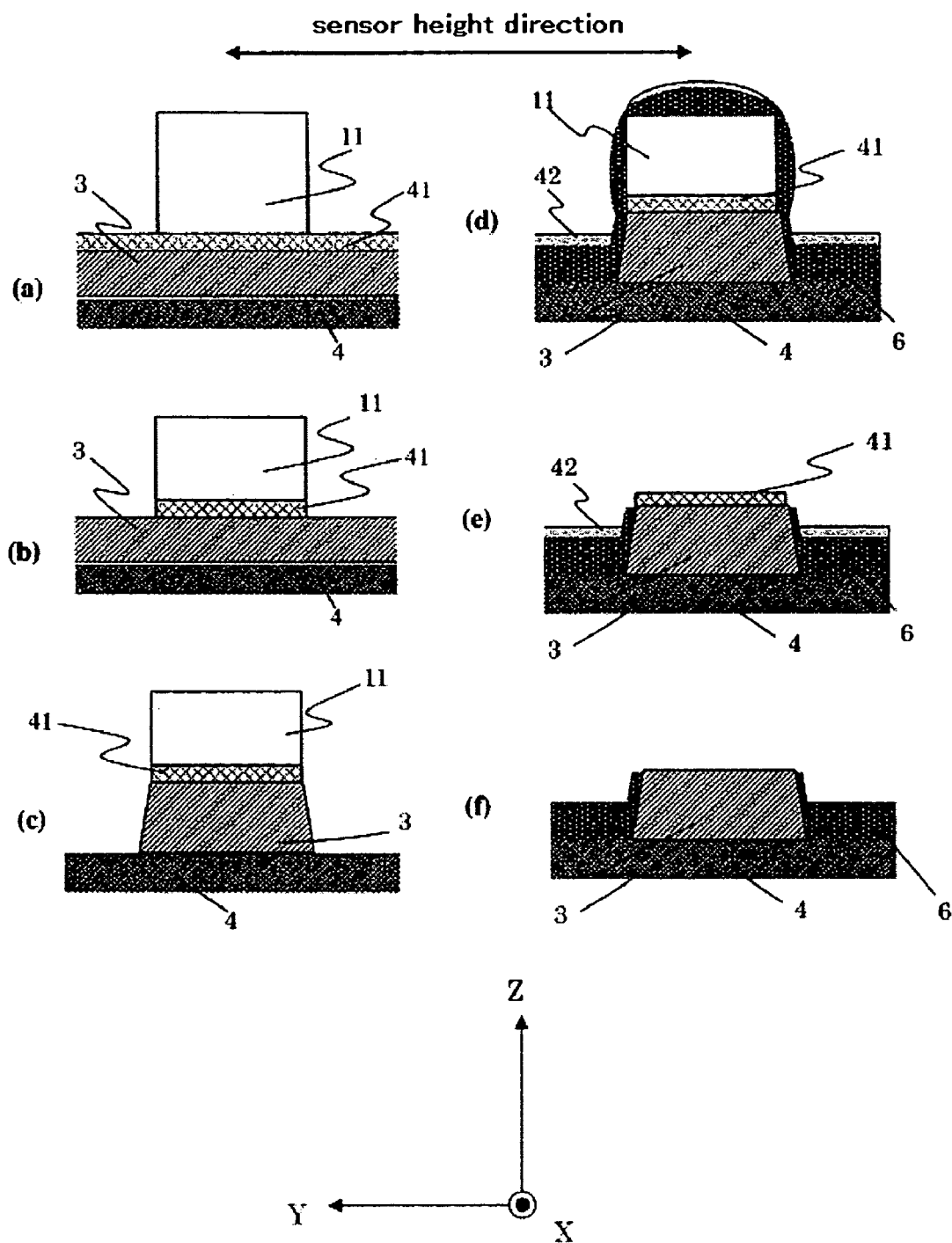
FIG. 4 is a flow diagram of the process of forming the sensor height of the CPP read sensor by the CMP lift-off process.

Among these structures, the structure described in (1) is requisite for preventing a path, along which the sense current flows into the lower shield layer 4 without passing through the free, intermediate, and pinned layers, from being formed to avoid an output degradation of the read sensor. Moreover, in the structures described in (2) and (3), as a step (e) shown in FIG. 4, the second stopper layer 42 for protecting the refill film along the sensor height direction 6 is disposed at a higher position than the first stopper layer 41 for protecting the magnetoresistance layer 3 in the lift off process using CMP, and thereby the polishing pad is easy to hit against the second stopper layer 42 while it is difficult to hit against the corner of the first stopper layer for protecting the magnetoresistance layer 3, avoiding exposure of the side wall of the magnetoresistance layer 3 along the sensor height direction by CMP. Furthermore, it is expected that it is difficult for the polishing pad to hit against the first stopper layer 41 for protecting the magnetoresistance layer 3 and therefore, damages to the magnetoresistance layer 3 caused by CMP may be minimized.

Compared with the conventional structures, the effects of these structures allow the side wall of the magnetoresistance layer 3 along the sensor height direction, in particular, the layers lower than the intermediate layer 53 of the magnetoresistance layer 3, to be prevented from exposing and have an advantage in preventing the sense current from leaking, achieving a higher yield.

Thus, as shown in FIG. 9, it is further preferable that three structural requirements described below are met.

(4) The structure, in which the distance from the upper surface of the refill film along the sensor height direction 6 to the upper surface of the lower shield layer 4 within an interval between the point where the refill film along the sensor height direction 6 comes in contact with the magnetoresistance layer 3 and the point which is at a distance d away from the air bearing surface along the sensor height direction (in the Y axis+direction in FIG. 9) gradually increases (in other words, the structure, in which the refill film is separated along the sensor height direction, for example, at an interval of 20 nm; an average of distances of the intervals from the upper surface of the refill film along the sensor height direction 6 to the surface of the lower shield layer 4 is always larger than that of the previous intervals).

(5) The structure, in which when a straight line is drawn horizontally (to the surface of the lower shield layer) from the point closest to the upper shield layer 2 among those in contact with the magnetoresistance layer 3 at an angle of 30 degrees, the upper surface of the refill film along the sensor height direction 6 is always positioned at a point lower than the straight line. Namely, when a straight line connecting a point closest to the upper shield layer 2 among points where the refill film along the sensor height direction 6 comes in contact with the magnetoresistance layer 3 is horizontally drawn, a formed angle θ is less than 30 degrees.

(6) The difference of the beeline between the upper surface of the refill film along the sensor height direction 6 and the surface of the lower shield layer 4 is within 10% of the average length (distance b in FIG. 9) at a point, which is beyond the point which is at a distance d away from the air bearing surface along the sensor height direction (Y axis+ direction in FIG. 9).

Meeting the structural requirement described in (4) in addition to the structure described in (1) to (3) achieves the structure which is capable of preventing the sense current from leaking and a step from being formed in the upper shield layer 2. Herein, the distance d described in (4) is shorter than at least that of the upper shield layer 2 along the sensor height direction, while it is longer than that of the magnetoresistance layer 3 along the sensor height direction. In the smallness area equal to or less than 20 nm, it is possible that the distance from the upper surface of the refill film along the sensor film direction 6 to the upper surface of the lower shield layer 4 does not necessarily increase gradually along the sensor height direction, depending on the degree of damages caused in the CMP process or the flatness of a substrate. However, it does not matter provided that such a state is confined to a smallness area.

Furthermore, an angle defined between the upper surface of the refill film along the sensor height direction 6 and the upper surface of the magnetoresistance layer 3 becomes more gradual by meeting the structural requirement described in (5), and therefore, slurry is difficult to pool on a boundary between the refill film along the sensor height direction 6 and the magnetoresistance layer 3 in the CMP process. The result is preventing the polishing rate from being locally high. Meeting the structural requirement described in (5) is useful in preventing the side wall of the magnetoresistance layer 3 along the sensor height direction (in particular, the layers lower than the intermediate layer 53) from exposing. Additionally, a step formed in the upper shield layer 2 may be reduced, and therefore the noise which occurs due to the shift of the magnetic wall of the upper shield layer 2 may be reduced.

In addition, the area of the second stopper layer 42 for protecting the refill film along the sensor height direction 6, against which the polishing pad hits in the process of lift-off using CMP, is larger by meeting the structural requirement described in (6). Therefore, the polishing rate is stable, resulting in successful suppression of the local distribution of polishing rate. It means that this is useful in preventing the side wall of the magnetoresistance layer 3 (in particular, the layers lower than the intermediate layer 53) from exposing.

The step formed in the upper shield layer 2 may be minimized as much as possible at the end of the magnetoresistance layer 3 along the sensor height direction by employing such a structure that the length of a perpendicular drawn from the upper surface of the refill film along the sensor height direction 6 to the upper surface of the lower shield layer 4 is the same as that of a perpendicular drawn from the upper surface of the magnetoresistance layer 3 to the upper surface of the lower shield layer 4 at a point closest to the upper shield layer 2 among those where the refill film along the sensor height direction 6 comes in contact with the magnetoresistance layer 3 as shown in FIG. 9. Therefore, it may produce a structure in which the noise that occurs due to the shift of the magnetic wall of the upper shield layer 2 may be reduced. It should be noted that the length of the perpendicular drawn from the upper surface of the refill film 6 to the upper surface of the lower shield layer 4 may vary within the range from 0.9 to 1.1 times the length of the perpendicular drawn from the upper surface of the magnetoresistance layer 3 to the upper surface of the lower shield layer 4 at a point closest to the upper shield layer 2 among those where the refill film along the sensor height direction 6 comes in contact with the magnetoresistance layer 3. This small range of the length of the perpendicular drawn from the upper surface of the refill film 6 to the upper surface of the lower shield layer 4 depends on the flatness of a substrate or damages caused by CMP. It does not matter, however, provided that a variation falls within this range.

An experiment was conducted using the magnetic head of the present invention shown in FIG. 9 to demonstrate its effects.

We fabricated many magnetic heads in which the distance a from the upper surface of the lower shield layer 4 to the upper surface of the magnetoresistance layer 3 was 50 nm and the length of the magnetoresistance layer along the sensor height direction was 100 nm and d was 500 nm. These magnetic heads were divided into some groups depending on the value of distance b in which the distance between the upper surface of the lower shield layer 4 and the upper surface of the refill film along the sensor height direction 6 shown in FIG. 9 was constant, and each group had 10,000 magnetic heads. We examined the percentage of the magnetic heads which the sense current leaked by using these magnetic heads. The result is as show in FIG. 11.

Figure 11:
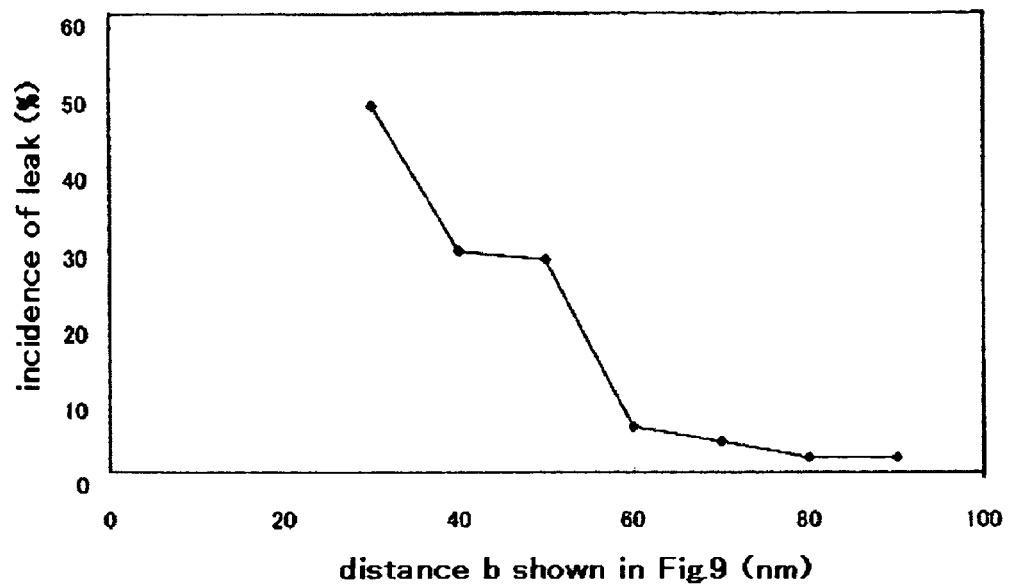
FIG. 11 is a diagram showing the relationship between a distance b and an incidence of sense current leak.

As known from the result shown in FIG. 11, the percentage of the magnetic heads which the sense current leaked was high in the case of the size of b being lower than 50 nm, while it was low in the case of the size of b being equal to or higher than 60 nm.

Figure 12:
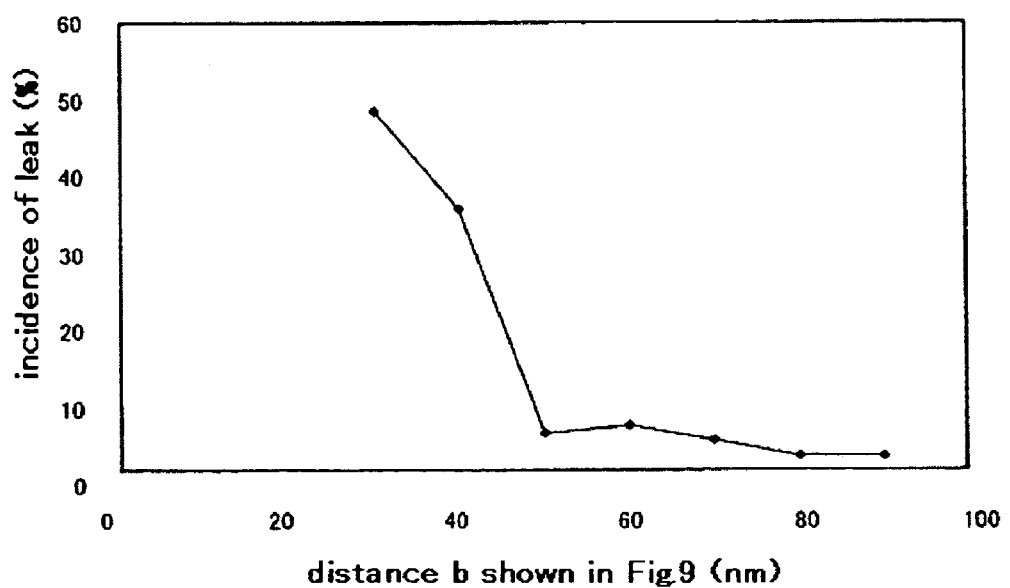
FIG. 12 is a diagram showing the relationship between the distance b and the incidence of sense current leak.

FIG. 12 shows the result of the same kind of experiment as that described above by using magnetic heads in which the distance a from the upper surface of the lower shield layer 4 to the upper surface of the magnetoresistance layer 3 was 40 nm. As seen from the result of this experiment, the percentage of the magnetic heads which the sense current leaked was low in the case of the size of b being equal to or higher than 50 nm.

As seen from these results, the appropriate length of b depends on the distance a from the upper surface of the lower shield layer 4 to the upper surface of magnetoresistance layer 3 and preferably, is approximately at least about 1.2 times the distance a.

Figure 8:
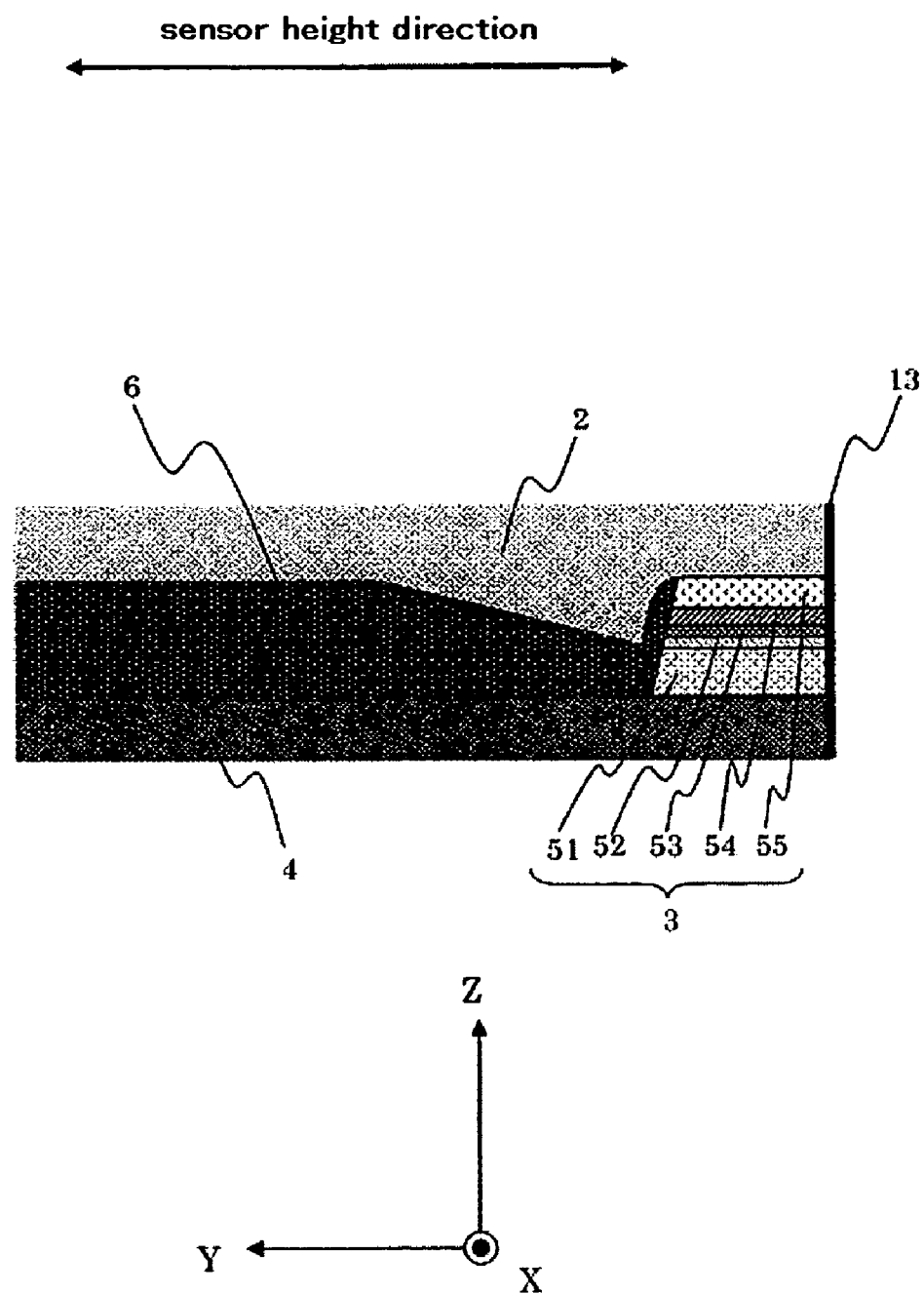
FIG. 8 is a schematic diagram explaining problems involved with the conventional CPP read sensor.
Figure 10:
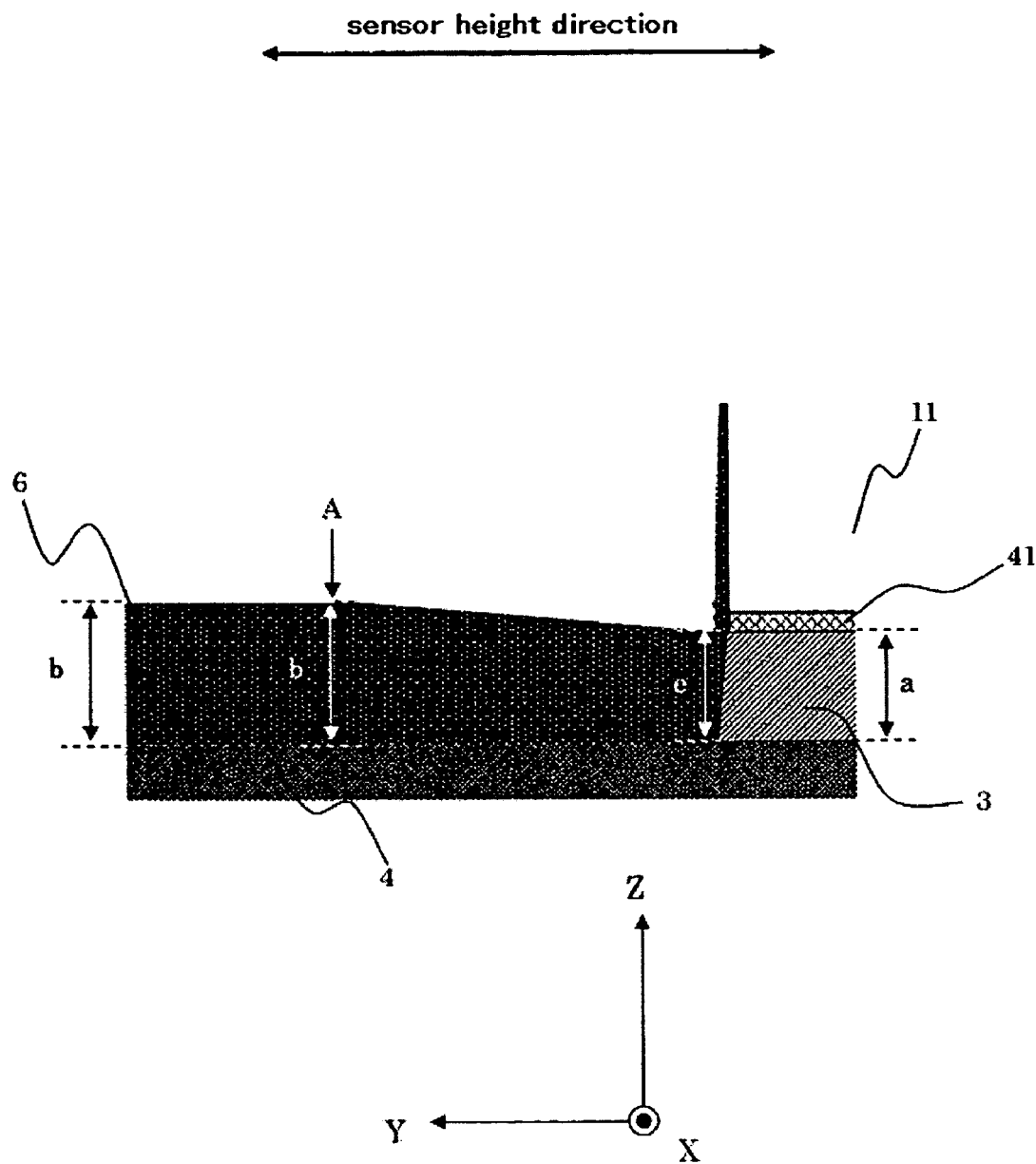
FIG. 10 is a schematic diagram explaining the shape of the cross section of the CPP read sensor of the present invention in the process of forming the sensor height.

In addition, we fabricated 10,000 conventional CPP magnetic heads having a structure shown in FIG. 8 and 10,000 magnetic heads of the present invention, in order to examine their manufacturing yield according to noise levels. The result shows that the yield was 66% for the conventional magnetic heads and 98% for the magnetic heads of the present invention. Herein, to estimate the effect of noise caused by the shift of the magnetic wall of the upper shield layer 2, the result of flowing a current into the magnetoresistance layer 3 with applying 100 Oe magnetic field along the sensor height direction to saturate the upper shield layer and the result of flowing a current into the magnetoresistance layer 3 without applying the magnetic field was compared to measure the level of noise. In this examination, the yield was determined by assuming that the magnetic heads, of which noise level was within ±50 μV, were good and those, of which noise level was without ±50 μV, were no good. The yield of the magnetic storage products mounting the magnetic head, of which noise level was within ±50 μV, was 96%.

The distance d shown in FIG. 9, which associates with the shape of the upper shield layer 2, may affect the shift of the magnetic wall of the upper shield layer 2. Accordingly, it may also affect the occurrence of noise. To examine the yield according to the levels of noise in the same manner, we fabricated magnetic heads, in which a was 50 nm, b was 60 nm and the length of the magnetoresistance layer along sensor height distance from the air bearing surface 13 was 50 nm. These magnetic heads were divided into some groups depending on the value of distance d, and each group had 10,000 magnetic heads. The result is as shown in FIG. 13.

Figure 13:
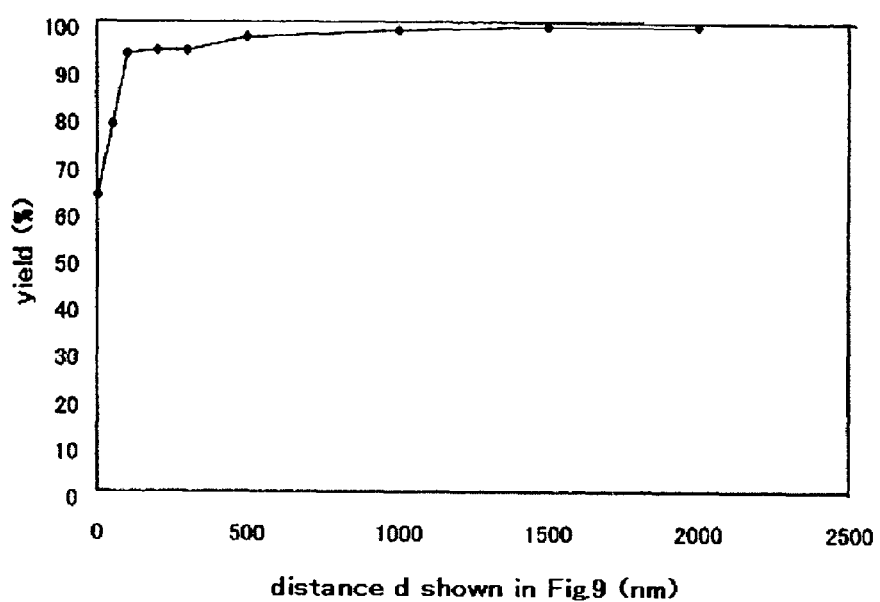
FIG. 13 is a diagram showing the relationship between a distance d and a yield of the magnetic head.

As shown in FIG. 13, at a smaller value for d, the yield was low. For example, yield was 93% at 100 nm of d, 95% at 500 nm of d, and 98% at 1000 nm or higher of d. 10,000 conventional CPP magnetic heads having a structure shown in FIG. 8 were fabricated to examine their yield. The result was 62%.

Figure 14:
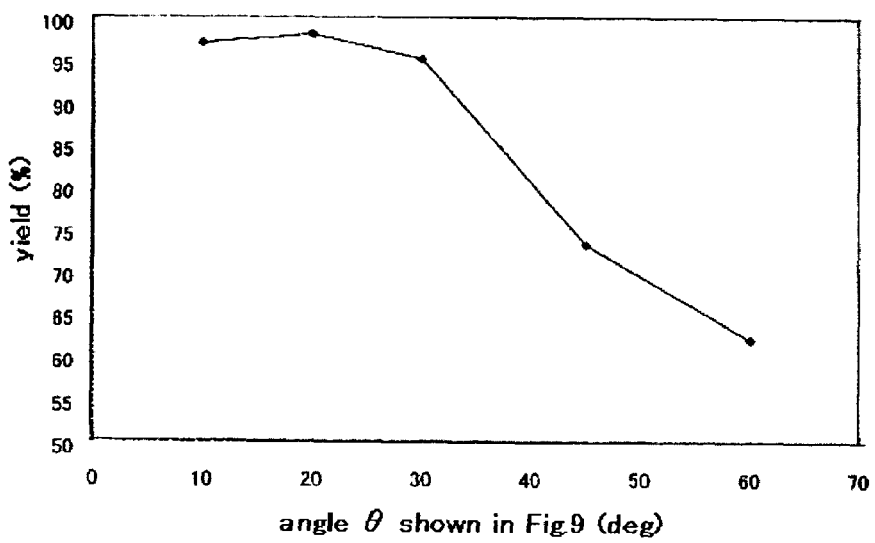
FIG. 14 is a diagram showing the relationship between the degree of an angle θ and the yield of the magnetic head.

The magnetic heads were fabricated assuming that an angle θ shown in FIG. 9 (an angle defined between a straight line connecting a point closest to the upper shield layer 2 among those where the refill film along the sensor height direction 6 comes in contact with the magnetoresistance layer 3 and a position A, and the surface of the lower shield layer) was 10 degrees, 20 degrees, 30 degrees, 45 degrees, or 60 degrees to examine their yield in the same manner. The result was as shown in FIG. 14. As shown in FIG. 14, 95% or more of yield might be ensured at an angle of 30 degrees or less. FIG. 14 shows that the yield has deteriorated as the angle θ grows, being 73% at 45 degrees and 62% at 60 degrees. As seen from the result, the angle θ is preferably about 30 degrees or less.

The yields of magnetic storage products mounting the magnetic head whose noise level was within ±50 μV were, 90% using the magnetic head whose yield in this experiment was 93%, 93% using the magnetic head whose yield in this experiment was 95%, and 96% using the magnetic head whose yield in this experiment was 98%, respectively.

Thus, the magnetic head structure of the present invention, even if CMP lift-off is applied in the process of forming the sensor, allows problems of the leaked sense current and of noise caused by the magnetic domain in the vicinity of the magnetoresistance layer 3 of the upper shield layer 2 to be solved, lift-off error to be solved, and any fence to be removed.

Now, the process of manufacturing the magnetic head of the present invention according to an embodiment is in detail described below. First, an insulator made of alumina or the like is coated on the surface of a substrate made of alumina titanium carbide or the like, precision polishing is applied by CMP or the like, and then the lower shield layer 4 is formed. This is fabricated by patterning a film composed of nickel-iron alloy prepared by, for example, sputtering, ion beam sputtering, or plating in a predetermined shape. By growing an alumina layer and applying CMP, the lower shield layer 4 and the alumina layer on it are planarized on the surface of the substrate. Further, a lead electrode film (not illustrated) is formed at a portion distant from the area where the magnetoresistance film 3 is fabricated at a later step. This is, for example, composed of a stack film of Ta, Au, and Ta.

On this lower shield layer 4, the magnetoresistance layer 3 is deposited by, for example, sputtering or ion beam sputtering. The magnetoresistance layer 3 contains a pinned layer composed of a layer containing, for example, a Co—Fe alloy ferromagnetic body, an intermediate layer composed of an oxide metal or metal such as, for example, aluminum oxide, Ta oxide, or Cu, and a free layer composed of a layer containing Ni—Fe alloy and Co—Fe alloy. And in some cases, the magnetoresistance layer 3 contains an under layer which is formed on the lower shield layer 4 and a cap layer which is formed under the upper shield layer 2. The under layer or the cap layer may contain a layer capable of stabilizing the magnetization orientation of pinned layer (usually, containing an antiferromagnetic material) and a magnetic domain control layer for suppressing Barkhausen noise in the free layer. In some cases, the magnetoresistance layer 3 has a plurality of structures composed of three layers: free, intermediate, and pinned layers.

Figure 21:
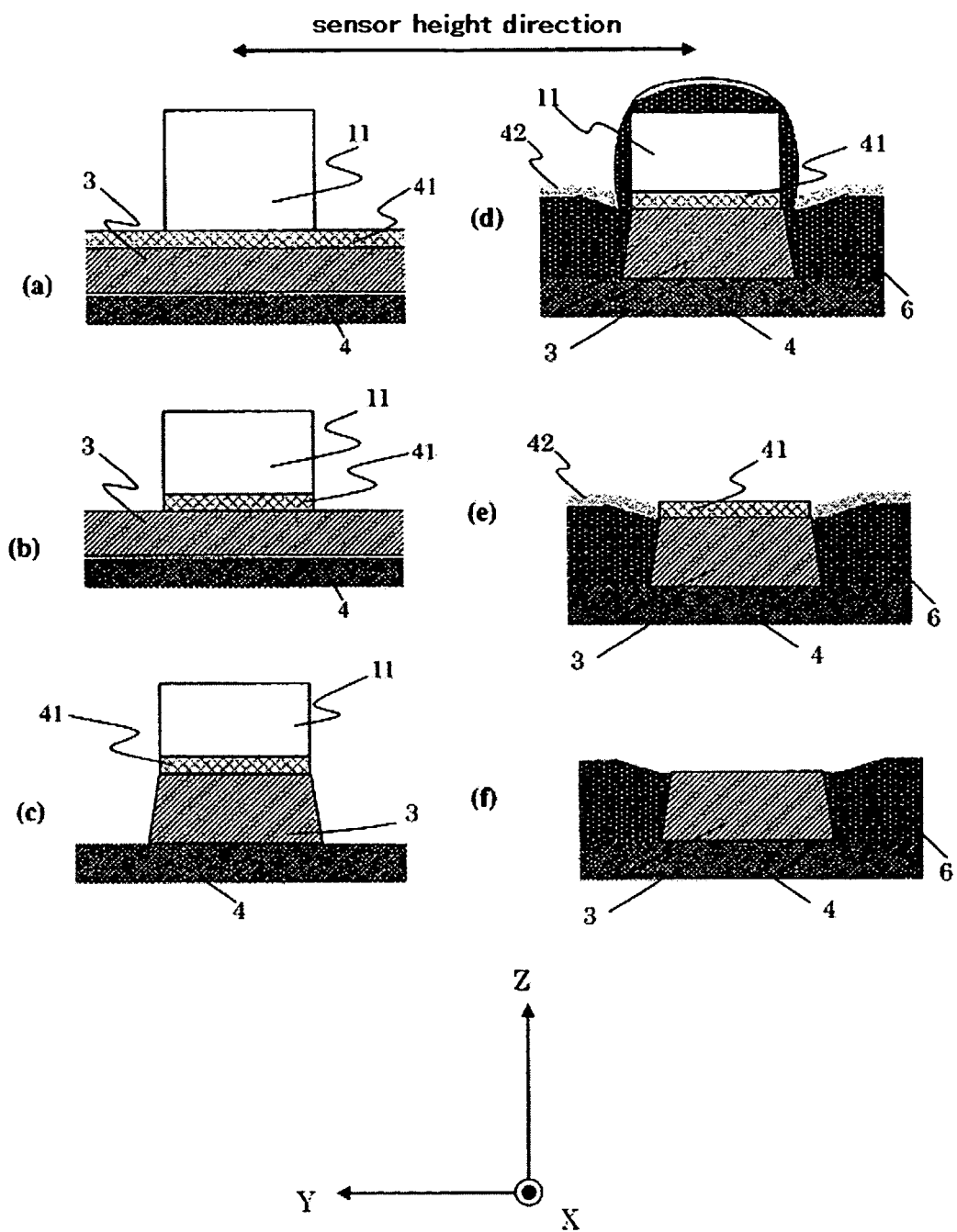
FIG. 21 is a flowchart of the process of forming the sensor height of the CPP read sensor of the present invention.

Now, a process of forming the sensor height direction is described in reference to FIG. 21. First, on the magnetoresistance layer 3, the first stopper layer 41 made of DLC or the like, of which CMP polishing rate is low, is deposited. Second, as shown in FIG. 21(a), resist is coated on the first stopper layer 41 and exposed by a photolithography machine and then developed with a developer to pattern into the desired shape, which is used as a lift-off mask 11. The lift-off mask 11 may be fabricated as a bilayer by coating poly dimethyl glutaric imide beneath the resist and patterning together with the resist. It may be fabricated as a multilayer containing an inorganic material. Third, as shown in FIG. 21(b), the first stopper layer 41 is patterned. This process may be omitted if the first stopper layer 41 can be etched together with the magnetoresistance layer 3 in the next process.

Fourth, as shown in FIG. 21(c), dry etching such as ion beam etching or reactive etching (RIE) is applied to the magnetoresistance layer 3 and the pattern along the sensor height direction is formed. At this time, it is possible that by etching with a second incidence angle which is more oblique than that of the first etching relative to the substrate, any substance re-deposited on the wall surface of the magnetoresistance layer 3 during the first etching is removed. The second incidence angle of etching is preferably 60 degrees to 80 degrees. Alternately repeating the first and second etching processes several times may be applied. Moreover, a different method may be used.

Fifth, as shown in FIG. 21(d), the refill film along the sensor height direction 6 is formed by sputtering or ion beam sputtering. A film stack may be used for this refill film 6 along the sensor height direction; however, it is required that at least its portion, which directly comes in contact with the magnetoresistance layer 3, be an insulator selected from materials such as Al oxide, Ti oxide, Si oxide, nitride, Si oxide, and Ta oxide or mixtures of these materials.

As shown in FIG. 10, it is further required to form the sensor height direction so that the distance from the upper surface of the refill film along the sensor height direction 6 to the upper surface of the lower shield layer 4 in the vicinity of the portion where the refill film along sensor height direction 6 comes in contact with the magnetoresistance layer 3 (the distance e in FIG. 10) be short than the distance from the upper surface of the refill film along the sensor height direction 6 to the upper surface of the lower shield layer 4 in the portions where the refill film along the sensor height direction 6 does not come in contact with the magnetoresistance layer 3.

Furthermore, it is preferable to form the sensor height direction so that the distance d from the upper surface of the refill film along the sensor height direction 6 to the upper surface of the lower shield layer 4 gradually increases in a region from the portion where the refill film along the sensor height direction 6 comes in contact with the magnetoresistance layer 3 to a point A at a certain distance away from that portion along the sensor height direction. Herein, the distance from the portion where the refill film along the sensor height direction 6 to the point A is preferably about 500 nm or more; namely, it is equal to or less than the length of the upper shield layer 2 along the sensor height direction. It is further preferable that at a point further away from the point A along the sensor height direction, the distance from the upper surface of the refill film along the sensor height direction 6 to the upper surface of the lower shield layer 4 is almost fixed. This aims at minimizing the local distribution of polishing rate in the subsequent CMP process.

The shape of the refill film along the sensor height direction 6 (values b and d in FIG. 9) may be controlled by means of the height of the lift-off mask 11, the method for forming the refill film along the sensor height direction 6, and the conditions of deposition.

Figure 5:
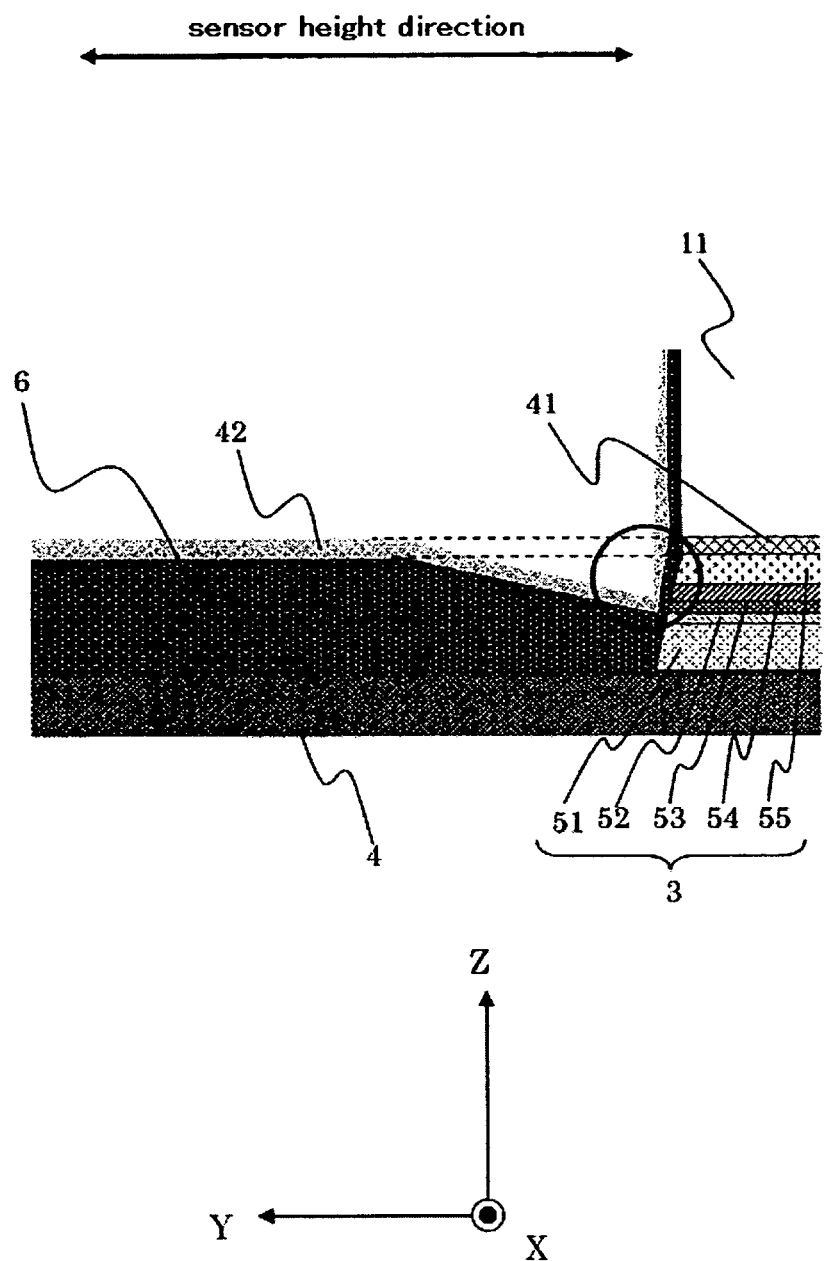
FIG. 5 is a schematic diagram explaining problems involved with a conventional CPP read sensor.
Figure 6:
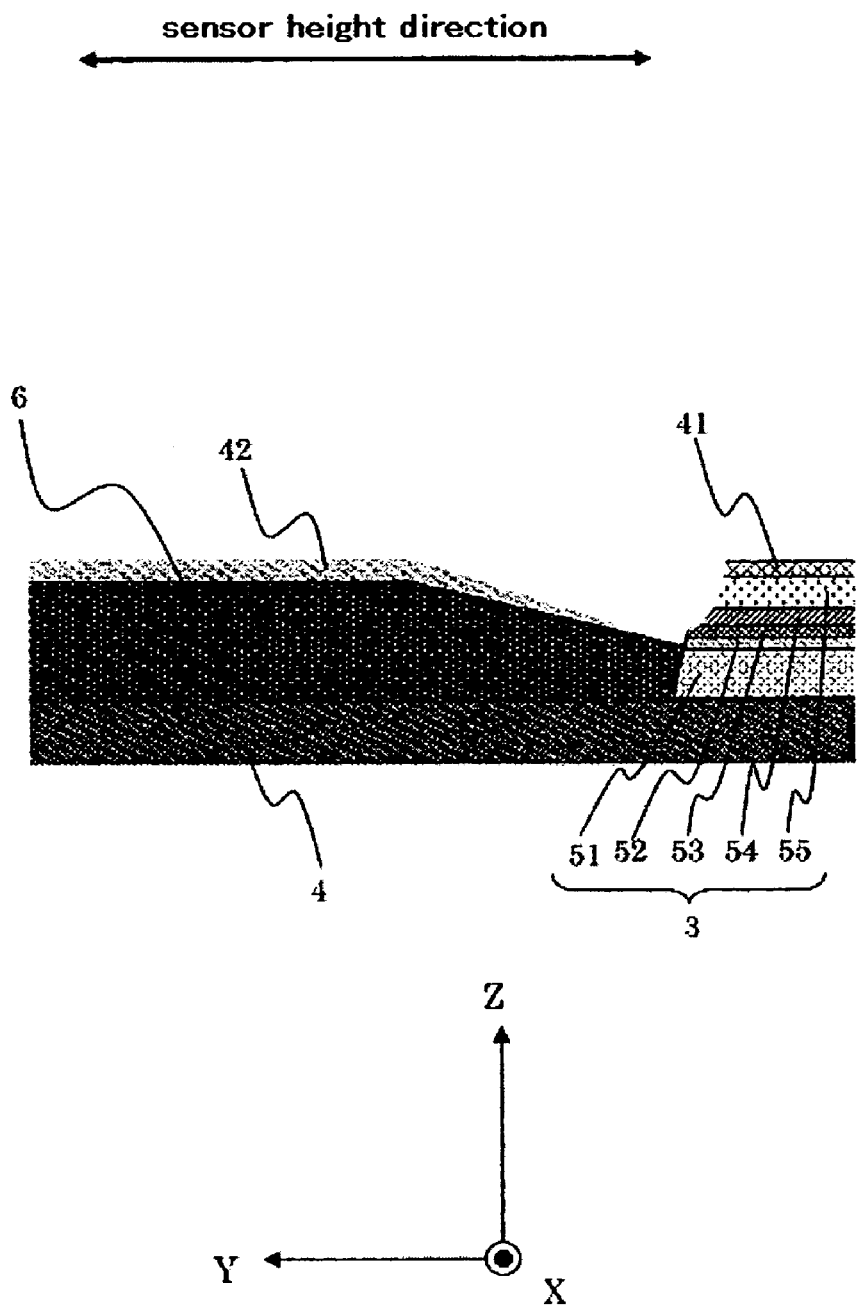
FIG. 6 is a schematic diagram explaining problems involved with the conventional CPP read sensor.
Figure 7:
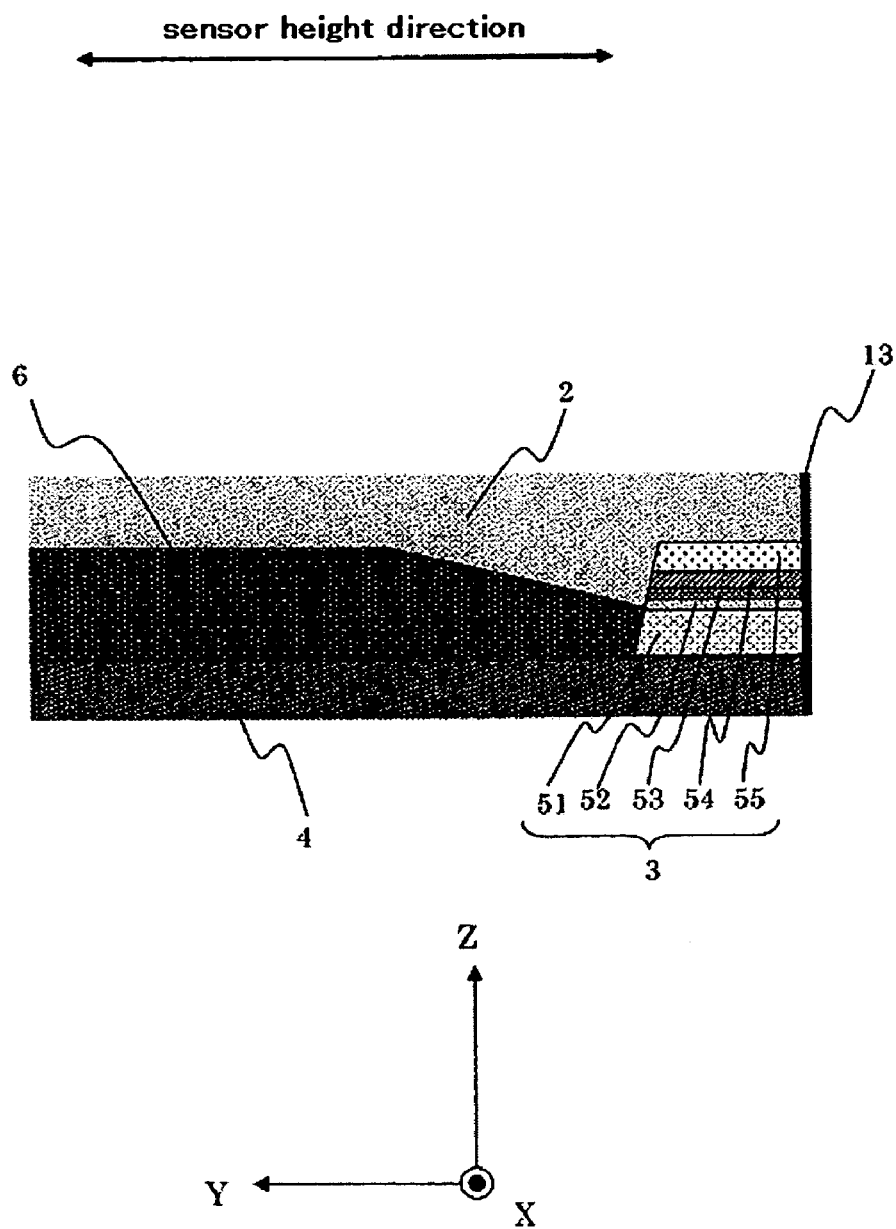
FIG. 7 is a schematic diagram explaining problems involved with the conventional CPP read sensor.
Figure 15:
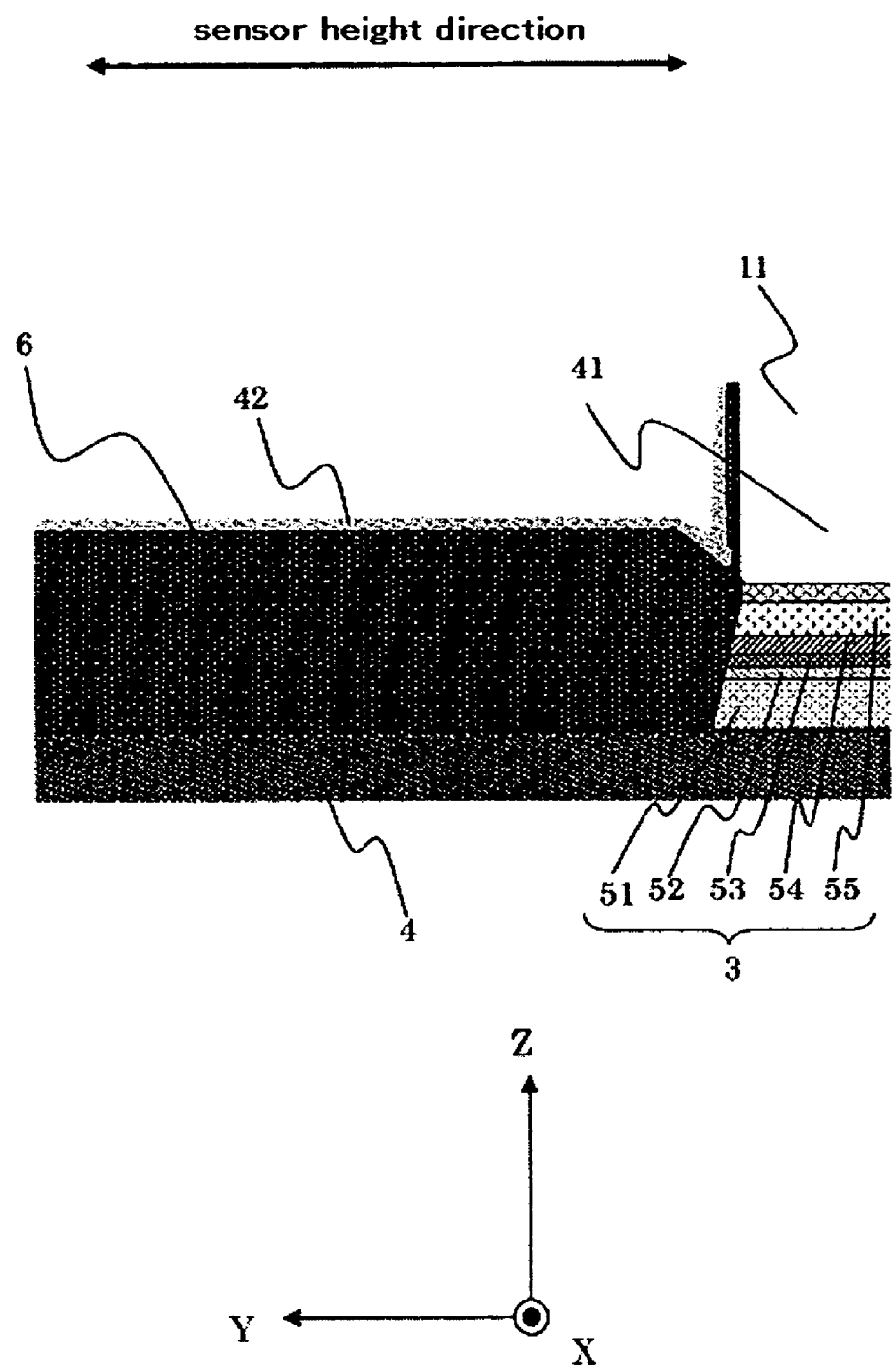
FIG. 15 is a schematic diagram explaining problems involved with the process of forming the conventional CPP read sensor.

According to the conventional process, the height of the lift-off mask 11 is approximately 200 nm, the thickness of the magnetoresistance layer 3 is 50 nm, and the thickness of the refill film along the sensor height direction 6 is the same as that of the magnetoresistance layer 3. As shown in FIG. 5, however, the conventional process has a disadvantage in that in the vicinity of the point where the refill film along the sensor height direction 6 comes in contact with the magnetoresistance layer 3, the upper surface of the refill film along the sensor height direction 6 is lower than the intermediate layer 53 of the magnetoresistance layer 3 and thereby the refill film along the sensor height direction 6 is polished in the vicinity of the point where the refill film along the sensor height direction 6 comes in contact with the magnetoresistance layer 3 in the subsequent CMP process. That means possibly forming a leak current path. Only by thickening the thickness of the refill film along the sensor height direction 6, a step (a steep slope) which may cause noise may be formed in the vicinity of the point where the refill film along the sensor height direction 6 comes in contact with the magnetoresistance layer 3 as shown in FIG. 15, and in some cases, lift-off cannot be successfully achieved even if CMP is applied.

To obtain the shape according to the present invention, it is important that the thickness of the refill film along the sensor height direction 6 is at least about 1.2 times or more the thickness of the magnetoresistance layer 3 and the height of the lift-off mask is about 4 to 5 or more times the thickness of the refill film along the sensor height direction 6.

Specifically, when the thickness of the magnetoresistance layer 3 was 50 nm and the height of the lift-off mask 11 was 500 nm and 70 nm of alumina layer was formed for the refill film along the sensor height direction 6 by sputtering, the shape as shown in FIG. 9 could be obtained. At that time, the distance of a perpendicular drawn from the upper surface of the refill film along the sensor height direction 6 to the upper surface of the lower shield layer 4 was 50 nm in the vicinity of the point where the refill film along the sensor height direction 6 came in contact with the magnetoresistance layer 3. The length of b was 70 nm and the length of d was 1.0 μm. The refill film along the sensor height direction 6 was formed under the conditions, 0.40 Pa of gas pressure, 200 W of target power, 150 mm of distance between target substrates, and 0 W of substrate bias power. The value b may be controlled by means of the thickness of the alumina layer to be formed. The value d may be controlled by the height of the lift-off mask 11. When the height of the lift-off mask was 1.0 μm with other conditions unchanged, the value d was 1.2 μm. By changing the bias power to be supplied on the substrate in the film forming process, the values b and d may be controlled.

Alternatively, the shape shown in FIG. 9 may be successfully obtained by ion beam sputtering. When the thickness of the magnetoresistance layer 3 was 50 nm and the height of the lift-off mask 11 was 500 nm and 60 nm of alumina layer was formed for the refill film along the sensor height direction 6 by ion beam sputtering, the shape as shown in FIG. 9 could be obtained. At that time, the distance of a perpendicular drawn from the upper surface of the refill film along the sensor height direction 6 to the upper surface of the lower shield layer 4 was 50 nm at the point where the refill film along the sensor height direction 6 came in contact with the magnetoresistance layer 3 and the length b shown in FIG. 9 was 60 nm, and the length of d was 1.3 μm. The refill film along the sensor height direction 6 was formed under the conditions: 420 mA of beam current, 1000 V of beam voltage, and 30 degrees of deposition angle. Alternatively, the values b and d may be controlled by deposition angle. For example, when the deposition angle was 45 degrees with other conditions unchanged, the length b was 60 nm and the length d was 1.7 μm. Herein the deposition angle is defined as an angle between a substrate surface and a target surface. For example, if the substrate and the target were disposed in parallel with each other, the deposition angle would be 0 (zero) degrees.

Subsequently, to remove the lift-off mask 11, lift-off is applied by CMP as shown in FIG. 21(e). Then, the first stopper layer 41 and the second stopper layer 42 are removed by reactive ion etching (RIE) using oxygen gas or the like as shown in FIG. 21(f).

After this process, the track width is formed. To form the track width, as in forming the sensor height, resist or both resist and PMGI are used to form the resist mask. And then dry etching such as ion beam etching and reactive ion etching (RIE) is applied to the magnetoresistance layer 3.

After the process of etching the magnetoresistance layer 3, the refill film along the track width direction 1 is formed. It is only required that the material of the refill film along the track width direction 1 at least in the portion where it directly comes in contact with the magnetoresistance layer 3 be an insulating material. Moreover, it is possible that a longitudinal bias layer or a side shield layer 5 may be formed on the refill film along the track width direction 1, however, the longitudinal bias layer or the side shield layer 5 is not always needed. Finally, the resist mask is removed to finish forming of the track width direction. To remove the resist mask, as in forming the sensor height direction, CMP may be used in some cases. In such as case, as in the process of forming the sensor height direction, the stopper layers are preferably disposed.

It does not matter what the order of precedence is between the process of forming the track width and the process of forming the sensor height. On the contrary to the order described above, the forming the track width may be ahead of the forming the sensor height.

Subsequently, the upper shield layer 2 made of a soft magnetic material is deposited on the upper part of magnetoresistance layer 3. To form the upper shield layer 2, first, a layer of metal material, Ta for example, may be deposited on the upper part of the magnetoresistance layer 3 as the under layer. Then, following a process of stacking an outgoing terminal and a process of fabricating a recording element for recording information, the magnetic head of the present invention may be obtained by forming the air bearing surface 13 in a process of forming a slider. Alternatively, after the recording element for recording information is fabricated, the read sensor may be deposited on it.

Figure 16:
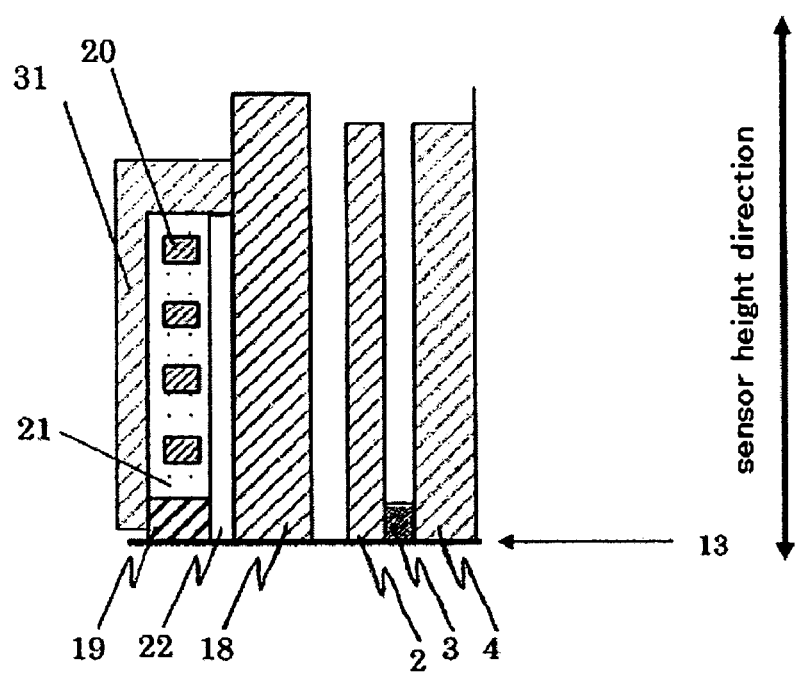
FIG. 16 is a schematic cross-sectional diagram of the magnetic head mounting the recording element for longitudinal recording.
Figure 17:
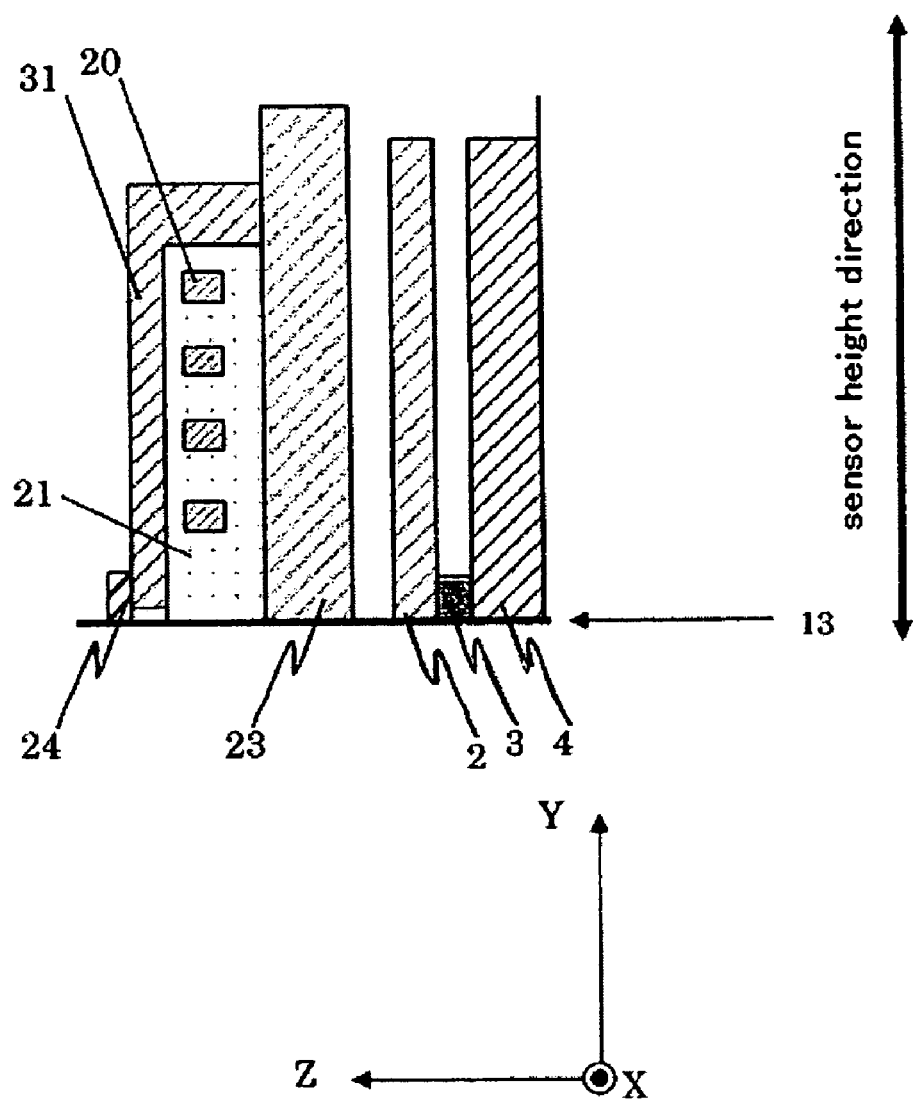
FIG. 17 is a schematic cross-sectional diagram of the magnetic head mounting the recording element for perpendicular recording.

FIGS. 16 and 17 are schematic cross sectional diagrams of the magnetic head of the present invention. FIG. 16 shows a longitudinal recording type of magnetic head and FIG. 17 shows a perpendicular recording type of magnetic head. As shown in FIG. 16, for the longitudinal recording type of magnetic head, the recording element is composed of a lower pole 18, an upper pole 19, a coil 20, a coil insulator 21, and a write gap 22. As shown in FIG. 17, for the perpendicular recording type of magnetic head, the recording element is composed of an adjunct pole 23, a main pole 24, and a single pole type head having a coil 20 and a coil insulator 21.

Figure 18:
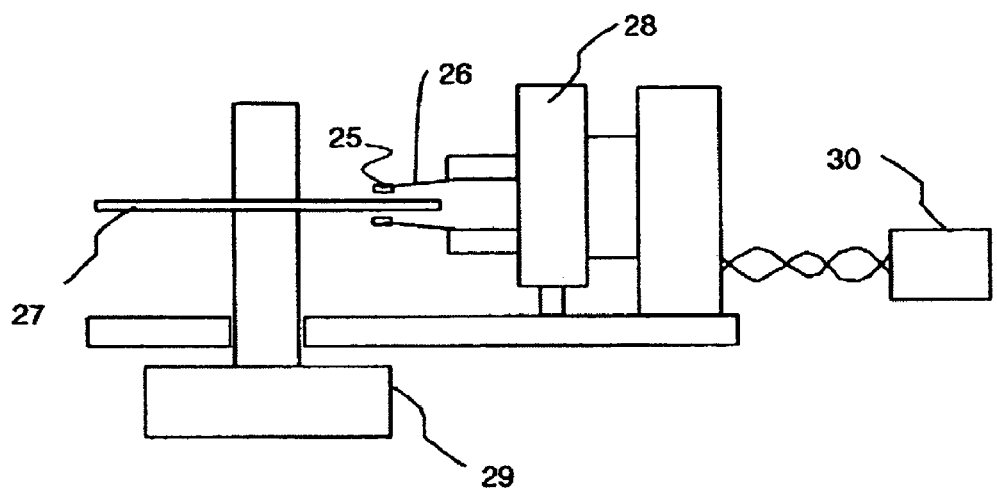
FIG. 18 is a schematic diagram of the magnetic storage.

FIG. 18 is a schematic diagram of the magnetic storage having the magnetic head 25 of the present invention. The magnetic storage has a magnetic recording medium 27, which is rotationally driven by a motor 29, the magnetic head 25 mounting the recording head and the read head, a voice coil motor (actuator) 28, and a signal processing circuit 30. The magnetic head 25 attached to the tip of gimbals 26 is moved over the magnetic recording medium 27 by the voice coil motor 28 to position on a desired track. Any recording signal is supplied to the recording head of the magnetic head 25 through a signal processing circuit 30 to cause magnetization flip on the magnetic recording medium 27 for recording. Any magnetic leakage field due to recording magnetization on the magnetic recording medium 27 is detected by the read head of the magnetic head 25, and the detected signal is processed in the signal processing circuit 30 and then sent to a processing unit as read signal.

Figure 19:
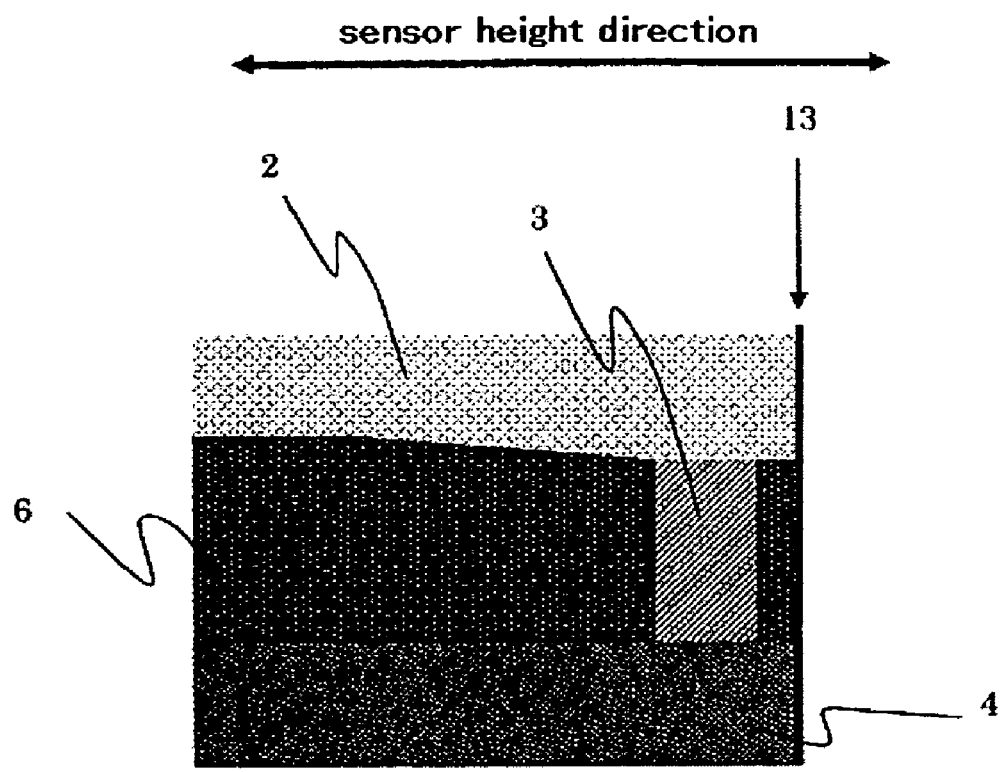
FIG. 19 is a schematic diagram of the cross section of the magnetic read sensor, of which magnetoresistance layer is disposed away from the air bearing surface along the sensor height direction.
Figure 19:
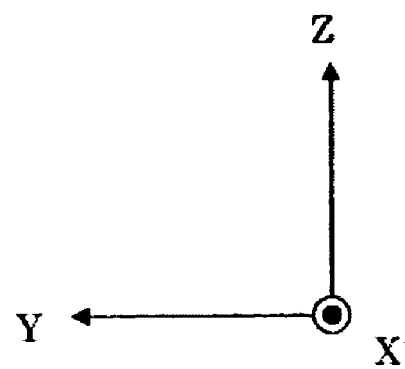
Figure 20:
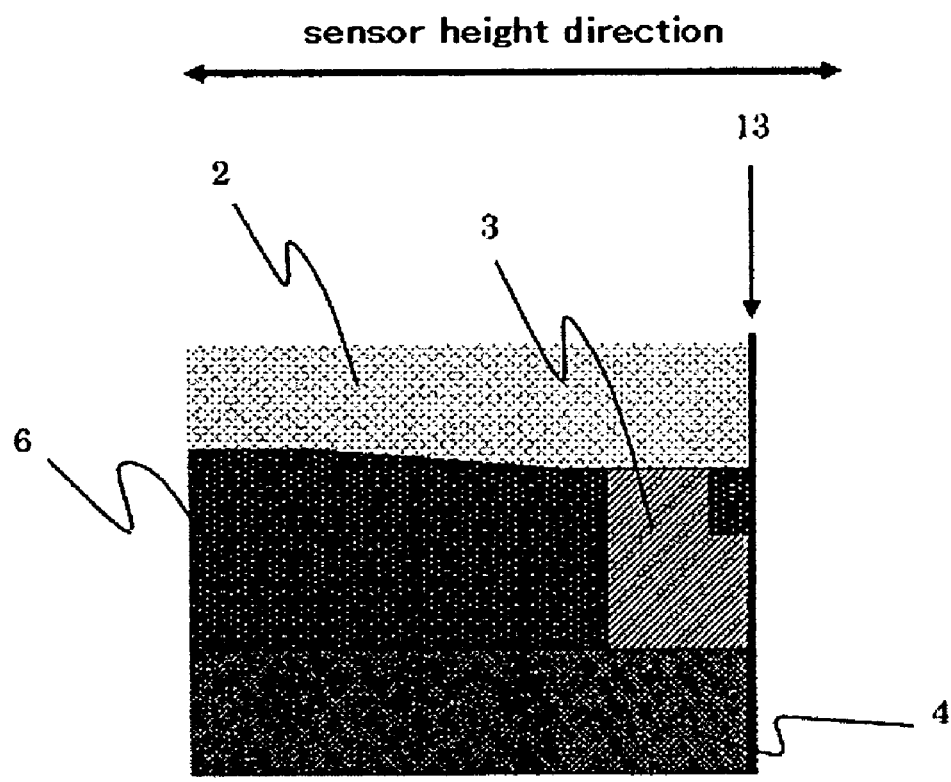
FIG. 20 is a schematic diagram of the cross section of the magnetic read sensor, of which only part of magnetoresistance layer exposes against the air bearing surface along the sensor height direction.
Figure 20:
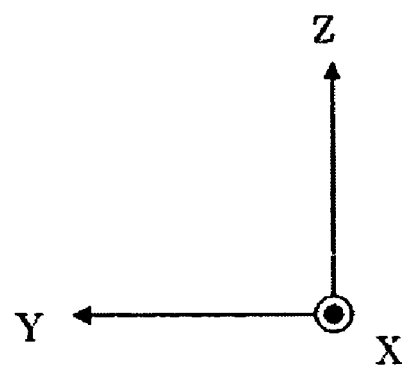

The effects of the present invention do not vary depending on the magnetic domain control method. The method, by which a longitudinal bias layer is disposed along the track width direction and the method, by which the magnetic domain control layer is disposed in the magnetoresistance layer 3, also have the same effects. Furthermore, the structure of the present invention is also useful for the magnetic head which the magnetoresistance layer 3 is disposed in the back further than the air bearing surface 13 along the sensor height direction as shown in FIG. 19, and for the magnetic head which only part of the magnetoresistance layer 3 faces to the air bearing surface 13 as shown in FIG. 20.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
   a magnetoresistance layer;
   lower and upper shield layers, which also act as a pair of electrodes, disposed so that the magnetoresistance layer is disposed between them along a magnetoresistance layer thickness direction;
   a refill film disposed at an end of the magnetoresistance layer along a sensor height direction, wherein assuming that a thickness of the magnetoresistance layer is "a" and a thickness of the refill film is "b", a relationship b>a is established,
   wherein the refill film has a region, in which the thickness of the refill film monotonously increases along a sensor height direction thereof from "a" to "b", and a region, in which subsequently the constant thickness of "b" is maintained continuously.

2. The magnetic head according to claim 1,
   wherein the thickness of the refill film at a point where the refill film comes in contact with the magnetoresistance layer is approximately equal to "a".

3. The magnetic head according to claim 2, wherein a relationship b≧1.2a is established.

4. The magnetic head according to claim 1, wherein the refill film is disposed at a point lower than a straight line drawn from one closest to the upper shield layer among points, at which the refill film comes in contact with the magnetoresistance layer, along the sensor height direction at an angle of about 30 degrees relative to a surface of the lower shield layer.

5. A magnetic storage mounting a magnetic recording medium, a motor driving the magnetic recording medium, a magnetic head reading data from the magnetic recording medium, and an actuator driving the magnetic head relative to the magnetic recording medium,
   wherein the magnetic head has a magnetoresistance layer, a pair of electrodes disposed so that the magnetoresistance layer is sandwiched between them in its thickness, and a refill film disposed at an end of the magnetoresistance layer along a sensor height direction, and assuming that a thickness of the magnetoresistance layer is "a" and a thickness of the refill film is "b", a relationship b>a is established,
   wherein the refill film has a region, in which the thickness of the refill film monotonously increases along a sensor height direction thereof from "a" to "b", and a region, in which subsequently the constant thickness of "b" is maintained continuously.

6. The magnetic storage according to claim 5,
   wherein the thickness of the refill film at a point where the refill film comes in contact with the magnetoresistance layer is approximately equal to "a".

7. The magnetic storage according to claim 6, wherein a relationship b≧1.2a is established.

8. The magnetic storage according to claim 5, wherein the refill film is disposed at a point lower than a straight line drawn from one closest to the upper shield layer among points, at which the refill film comes in contact with the magnetoresistance layer, along the sensor height direction at an angle of about 30 degrees relative to a surface of the lower shield layer.

* * * * *